United States Patent [19]

Dodson

[11] Patent Number: 5,012,424
[45] Date of Patent: Apr. 30, 1991

[54] MULTIPLE SENSOR SYSTEM AND METHOD

[75] Inventor: David W. Dodson, Glendale, Ariz.

[73] Assignee: Honeywell Inc., Minneapolis, Minn.

[21] Appl. No.: 313,927

[22] Filed: Feb. 22, 1989

[51] Int. Cl.$^5$ .................... G05D 1/10; G01C 21/00
[52] U.S. Cl. .................................. 364/449; 364/453; 342/450
[58] Field of Search ............... 364/559, 454, 453, 457, 364/447, 449, 550, 551.01, 434, 571.01; 340/988; 342/450, 454–457

[56] References Cited

U.S. PATENT DOCUMENTS

| | | | |
|---|---|---|---|
| 4,212,443 | 7/1980 | Duncan et al. | 364/453 X |
| 4,405,986 | 9/1983 | Gray | 364/434 |
| 4,806,940 | 2/1989 | Harral et al. | 364/449 X |
| 4,823,626 | 4/1989 | Hartmann et al. | 364/453 X |
| 4,831,563 | 5/1989 | Ando et al. | 364/457 X |
| 4,890,233 | 12/1989 | Ando et al. | 364/457 |

*Primary Examiner*—Joseph L. Dixon
*Attorney, Agent, or Firm*—Howard Paul Terry

[57] ABSTRACT

A multiple sensor system and method for computing position and velocity from data from three or more independent and similar inertial sensor units, which are connected to a computer unit, includes: resolving the data from each sensor unit into a common coordinate system for obtaining a unit position vector and a horizontal velocity vector for each of the three sensor units; comparing in a comparison test each unit position vector with a corresponding unit position vector of a selective prior reading thereof for each of the sensor units; comparing in the comparison test each velocity vector with a corresponding velocity vector of a selective prior reading for each of the sensor units; determining by using a selective comparison process which sensor units pass the comparison tests of the comparisons of each of the sensor units, and computing position and velocity using a first selective computing process if less than three sensor units pass their comparison tests, or computing position and velocity using a second selective computing process, if three or more sensor units pass their comparison tests.

10 Claims, 2 Drawing Sheets

LEGENDS:

∅  GEOCENTRIC/GEODETIC LONGITUDE
θ  GEOCENTRIC LATITUDE
α  GEODETIC LATITUDE

MULTIPLE SENSOR SYSTEM AND METHOD

The invention relates to a multiple sensor system and method, and in particular the invention relates to a multiple sensor system and method for computing inertial position and velocity from data from three or more independent inertial sensors.

This invention consists of a sensor usage and data averaging method and system for use on any vehicle (aircraft, submarine, ... etc.) which employs multiple inertial sensors as a means to compute a position and velocity which is especially useful in the polar regions of the globe because it is not affected by the convergence of longitude lines into the poles.

BACKGROUND OF THE INVENTION

As a result of errors in the position computed by inertial sensors and polar discontinuities in latitude and longitude, there can be a disparity in the north reference between the various inertial sensors aboard a vehicle which is near a pole. The north reference disparity among the inertial sensors prevents a direct and meaningful determination of velocity/track reasonableness (by comparing velocity data among the various sensors) from being made. Also, a simple or weighted average of position and velocity data output by multiple inertial sensors becomes very error prone as the aircraft approaches a pole.

In addition, any previously computed and stored inertial position bias (latitude and longitude errors) becomes subject to error when the north reference of the vehicle changes as it progresses across the globe. A changing north reference causes the stored inertial position bias to appear to rotate resulting in position accuracy degradation if this phenomena is not accounted for. At higher latitudes the error induced as a result of a changing north reference can become so severe that it is not desirable to use a previously computed and stored inertial position bias in the form of latitude and longitude errors.

A prior art system is described in U.S. Pat. No. 3,214,575, issued Oct. 26, 1965. Related patents include U.S. Pat. Nos. 3,232,103, issued Feb. 1, 1966, 4,405,986, issued Sept. 20, 1983, 4,520,445, issued May 28, 1985, and 4,675,820, issued June 23, 1987. Other background patents include U.S. Pat. Nos. 3,339,062, issued Aug. 29, 1967, 3,940,597, issued Feb. 24, 1976, 4,168,524, issued Sept. 18, 1979, and 4,442,491, issued Apr. 10, 1984.

Although the prior art systems have one thing in common, i.e., they all utilize an algorithm which may be employed in a navigation device to compute navigation quantities (position, velocity, vehicle attitude, etc.), none of them are concerned with the problem of multiple independently operating navigation units wherein each unit provides separate complete navigational quantities for comparison in the manner of the present invention.

As a result of independent operation and uncontrollable manufacturing differences, the navigational quantities estimated by each unit (i.e., position and velocity) would drift away from the actual values in an unknown and random way. The problem then becomes one of determining which of the units if any were functioning properly and then to combine data from all of the functioning units in such a way that the best estimate of the actual navigational quantities could be obtained. This estimate would provide greater accuracy than any of the units operating alone. None of the prior art systems accomplish this result in the manner of the present invention.

There are certain additional disadvantages of the prior art that will become evident which include:

1. At high and low latitudes, storing the inertial position bias as latitude and longitude errors is not desirable since the changing north reference of the vehicle will cause the values stored to be incorrect if they are not continuously updated (which is often impossible).

2. Washing out the position bias degrades aircraft position accuracy.

3. The computed inertial position and velocity are less accurate if inertial position and velocity data is not averaged.

4. There is no way to detect excessive drift in an inertial reference unit if comparison tests with other inertial positions and velocities are not performed.

5. The reduction in position accuracy as a result of washing out an inertial position bias when approaching the pole can create problems for a system which also computes a position(s) by means other than inertial sensors. Typically, the computer noninertial position must be compared to a reference position (usually the inertial position plus the inertial position bias) to determine if data from the noninertial sensor (or sensors) is reasonable enough to be used. If the accuracy of the reference position is reduced significantly by the loss of the inertial position bias, then determination of whether a noninertial position is reasonably correct can be severely complicated.

SUMMARY OF THE INVENTION

The inertial sensor usage and data averaging method of the present invention provides for the transformation of inertial position data, velocity data, and a computer inertial position bias into a common coordinate system which is free of the discontinuities present with a latitude/longitude coordinate system. Using this common coordinate system, an estimate of inertial sensor accuracy and the averaging of inertial sensor data can be accomplished. After performing the accuracy and averaging computations, the resulting position and velocity data is transformed back into a geodetic latitude/longitude system for use and display by the user.

A common coordinate system which is free of discontinuities allows for an accurate comparison of postion and velocity data from each sensor and also allows for accurate averaging of positions and velocities and an accurate measure of a previously computed inertial position bias is maintained. All of the shortcomings discussed above for the prior art are overcome by using this method.

According to the present invention a multiple sensor system and method are provided in which the multiple sensor system includes 3 or more sensor units, said sensor units being substantially the same, each sensor unit providing measurements of latitude/longitude and vector velocity, each sensor unit having an output terminal for a multi-line connector; a computer having input terminals for each multi-line connector from said sensors and an output terminal; a multi-line connector connected between each sensor output terminal and the computer.

According to the present invention, a multiple sensor method of position and velocity determination using data from the three or more sensor units is also provided. The multiple sensor method includes, resolving the data from each sensor unit into a common coordinate system for obtaining a unit position vector and a horizontal velocity vector for each sensor unit; comparing in a comparison test each unit position vector with a unit position vector of a selective prior reading for each sensor unit; comparing in the test each velocity vector with a velocity vector of a selective prior reading for each sensor unit; using a selective formula, determining which sensor units pass the comparison test; if three or more sensor units pass the comparison tests, then computing positon and velocity by a selective formula which incorporates a bias estimate and uses data from all sensor units passing the comparison tests; and if less than three sensor units pass the comparison tests, then computing position and velocity by a selective formula using data from the one sensor unit having the best comparison test results and a bias estimate.

By using the structure and method according to the invention, wherein multiple independently operating sensor units are provided, and wherein each sensor unit provides separate complete navigational quantities for comparison, the problems of the prior art structure and methods are avoided.

The foregoing and other objects, features and advantages will be apparent from the following description of the preferred embodiment of the invention as illustrated in the accompanying drawings.

DESCRIPTION OF THE PREFERRED EMBODIMENT

Figure 1:
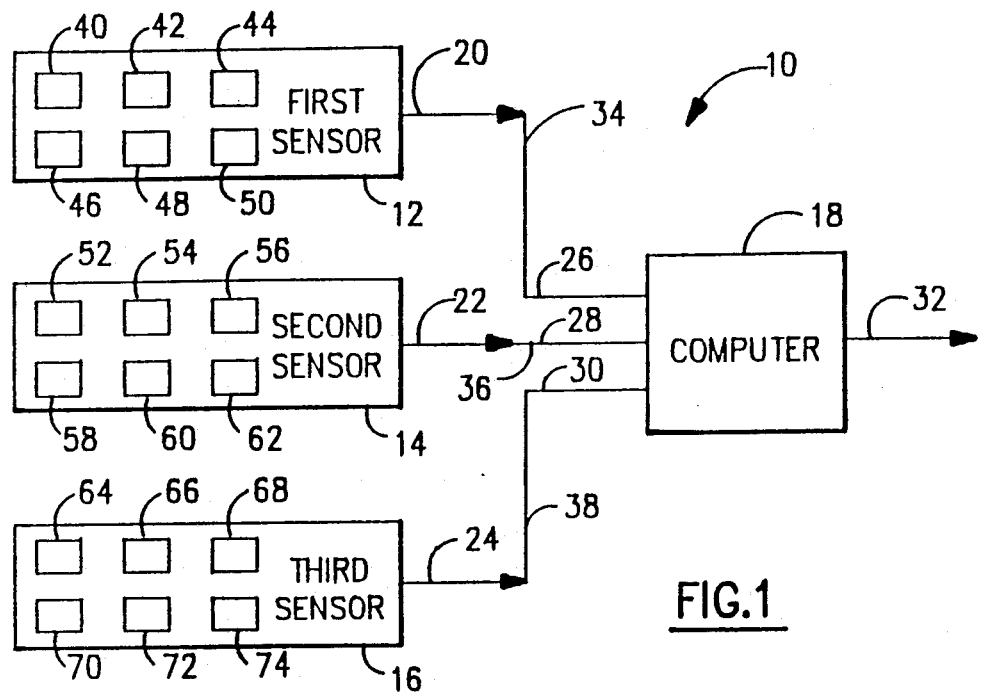
FIG. 1 is a schematic plan view of a multiple sensor system according to the invention.

As shown in FIG. 1, a multiple sensor system 10 according to the invention is provided. System 10 includes, for purposes of example, a first sensor unit 12, a second sensor unit 14, a third sensor unit 16, and a computer unit 18.

Sensors 12, 14, 16, which are inertial sensors, have respective multi-line output terminals 20, 22, 24. Computer 18, which has a coordinate converting capability, has multi-line input terminals 26, 28, 30 and a multi-line output terminal 32. Computer input terminals 26, 28, 30 have respective multi-line connectors 34, 36, 38, which respectively connect to output terminals 20, 22, 24.

Sensor 12 has three gyroscopes 40, 42, 44 which are disposed in quadrature, and has three accelerometers 46, 48, 50, which are disposed in quadrature. Sensor 14 has three gyroscopes 52, 54, 56 which are disposed in quadrature, and has three accelerometers 58, 60, 62 which are disposed in quadrature. Sensor 16 also has three gyroscopes 64, 66, 68 which are disposed in quadrature, and has three accelerometers 70, 72, 74 which are disposed in quadrature. Each of the sensor units 12, 14, 16 provides inertial position data and inertial velocity data.

Figure 2:
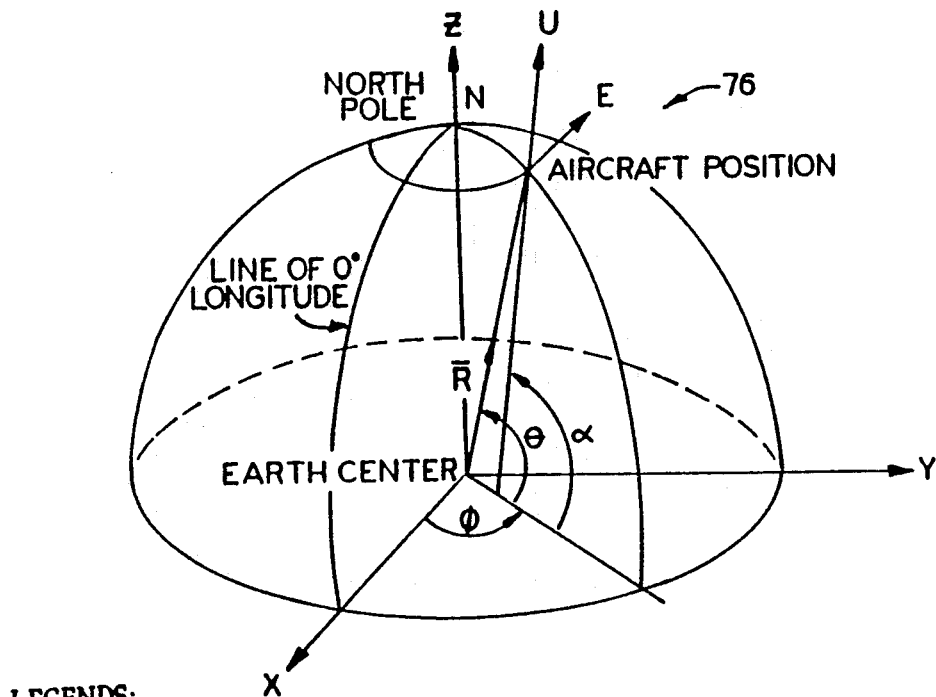
FIG. 2 is a schematic view of a representation of an XYZ coordinate system of geometry.

Computer 18 converts the inertial position data and the inertial velocity data to a common coordinate system 76, in this instance shown as XYZ, as represented schematically in FIG. 2.

Figure 3:
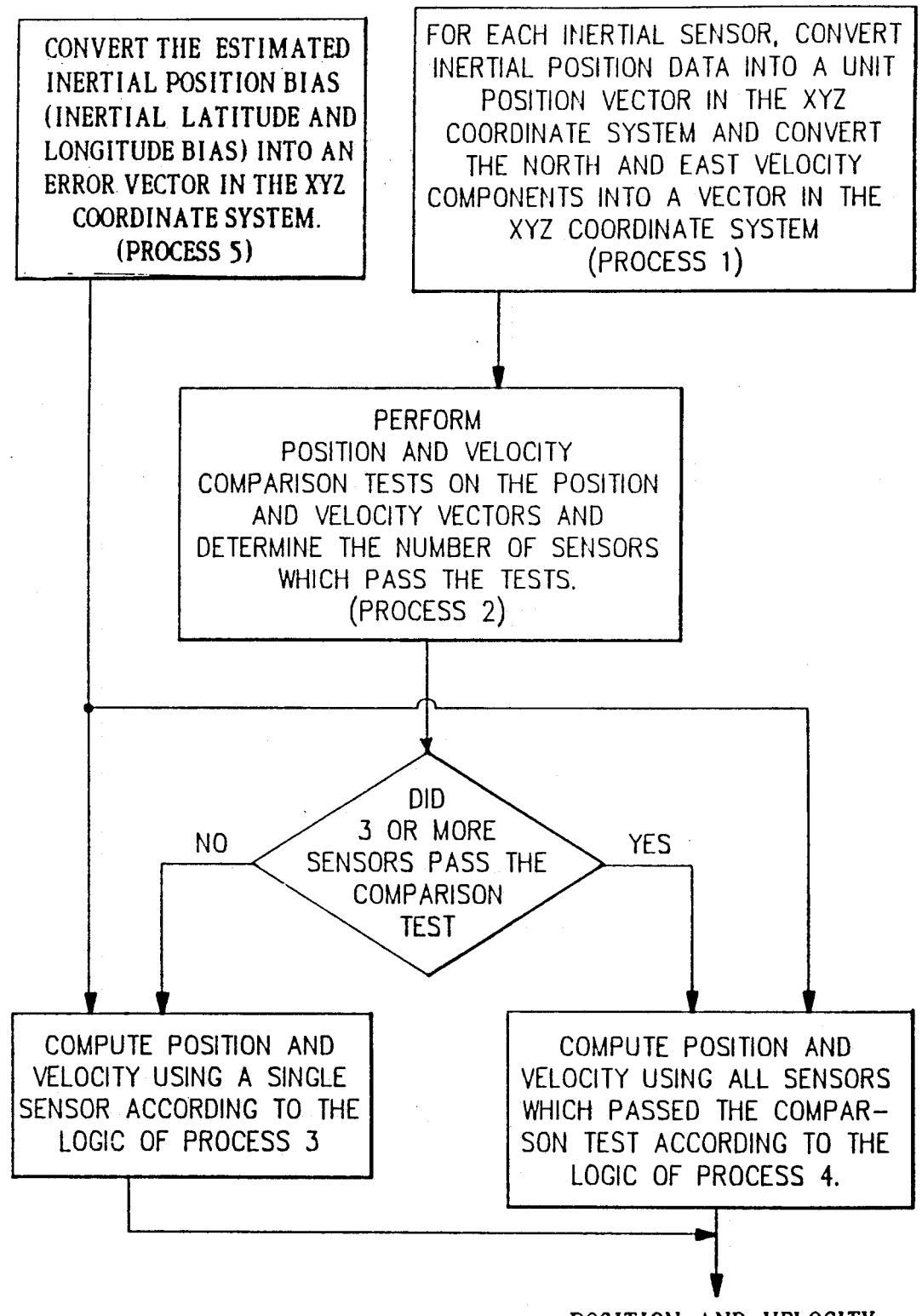
FIG. 3 is a flow diagram depicting the general flow of logic of the multiple sensor method according to the invention.

As shown in FIG. 3, a multiple sensor method of sensor usage and of computation of position and velocity from the data of sensors 12, 14, 16 and a bias estimate is provided. FIG. 3 is a flow diagram, which depicts the general flow of logic of the multiple sensor method. This method according to the invention determines sensor usage and computes position and velocity from the inertial sensor data by applying the five processes as listed below:

1. Resolving the Data for Each Inertial Sensor Into A Common Coordinate System. The position output by each inertial sensor is resolved into a unit position vector in the XYZ coordinate system (see FIG. 2) by using the equation below:

$$R_i = \begin{bmatrix} X_i \\ Y_i \\ Z_i \end{bmatrix} = \begin{bmatrix} \cos(\theta_i)\cos(\phi_i) \\ \cos(\theta_i)\sin(\phi_i) \\ \sin(\theta_i) \end{bmatrix}$$

and the horizontal velocity data output by each inertial sensor is resolved into the XYZ coordinate system by using the equation below:

$$V_i = \begin{bmatrix} V_{xi} \\ V_{yi} \\ V_{zi} \end{bmatrix} = \begin{bmatrix} -\sin(\phi_i) & -\sin(\alpha_i)\cos(\phi_i) \\ \cos(\phi_i) & -\sin(\alpha_i)\sin(\phi_i) \\ 0 & \cos(\alpha_i) \end{bmatrix} \begin{bmatrix} V_{Ei} \\ V_{Ni} \end{bmatrix}$$

where:
i is the index to indicate that the computation is being performed for the $i^{th}$ inertial sensor. i runs from 1 to N (the number of inertial sensors which are carried aboard the vehicle).

$\phi_i$ is the longitude output by $i^{th}$ inertial sensor.

$\alpha_i$ is the geodetic latitude output by the $i^{th}$ inertial sensor.

$V_{xi}$, $V_{yi}$ and $V_{zi}$ are the X, Y, and Z components of inertial velocity for the $i^{th}$ inertial sensor.

$V_{Ei}$ and $V_{Ni}$ are the east and north components of velocity output by the $i^{th}$ inertial sensor.

$\theta_i = \text{Atan} [(1 - \epsilon^2) \tan (\alpha_i)]$.

$\epsilon$ is the eccentricity of the earth model used by the inertial sensors.

(The inertial sensor typically supplies geodetic latitude, $\alpha$, but geocentric latitude, $\theta$, is needed for the conversion of inertial position data into a unit position vector in the XYZ system.)

$X_i$ = x-component of position for the $i^{th}$ inertial sensor.

$Y_i$ = y-component of position for the $i^{th}$ inertial sensor.

$Z_i$ = z-component of position for the $i^{th}$ inertial sensor.

$R_i$ is a notation representing the unit inertial position vector of the $i^{th}$ inertial sensor.

$V_i$ is a notation representing the velocity vector of the $i^{th}$ inertial sensor.

The XYZ coordinate system is defined as follows: the origin of the coordinate system lies at the center of the earth, the Z-axis points to the north pole, the X-axis points to the intersection of the Greenwich Meridian and the equator, and the Y-axis points to the intersection of the line of 90° longitude and the equator. (See FIG. 2.)

2. The Comparison Test. An inertial sensor is defined to have passed the comparison test if and only if it passes the position comparison test of process 2.1 and the velocity comparison test of process 2.2.

2.1 The Position Comparison Test. The current unit inertial position vector for each sensor (computed by process 1) is compared with the previously computed value of the unit inertial position vector computed by process 3.1 step 1 or process 4.1 step 2 (whichever is applicable). The equation below is used to determine whether or not an inertial sensor passes or fails the position comparison test.

If $A_i <$ POS_TOL radians then $IRU_i =$ Pass; Else $IRU_i =$ Fail where:

$IRU_i$ is the inertial sensor being tested.

$A_i = |R_{PREV} \times R_i|$ (radians)

($A_i$ is approximately the angle between the previous unit inertial position vector and the unit inertial position vector computed for the $i^{th}$ inertial sensor.)

$R_{PREV}$ is the previous unit inertial position vector computed by the logic of process 3.1, step 1 or process 4.1 step 2, whichever is applicable.

$R_i$ is the unit position vector computed for the $i^{th}$ inertial sensor by the logic of process 1.

X indicates that the vector cross product is to be performed.

POS_TOL is usually a small value and is adjusted with time to accomodate the drift rate specifications of the inertial sensors being used.

2.2 The Velocity Comparison Test. The current velocity vector for each inertial sensor (computed by process 1) is compared to the previous inertial velocity vector computed by the logic of process 3.2 step 2 or process 4.2 step 1, whichever is applicable. An inertial sensor is defined to pass the velocity comparison test if and only if the equation below is true.

$$\frac{|V_{PREV} \times V_i|}{|V_{PREV}||X||V_i|} < VEL\_TOL \text{ (radians)}$$

where:

$V_{PREV}$ is the previous value of the inertial velocity vector in the XYZ system ($V_x, V_y, V_z$) as computed in process 3.2, step 2, or process 4.2, step 1, whichever is applicable.

$V_i$ is the current value of velocity for the $i^{th}$ inertial sensor as computed by process 1.

X indicates that the vector cross product is to be performed.

x indicates multiplication VEL_TOL is usually a small value and is a function of the Shuler drift magnitude specified for the sensors being used.

3. Determination of Position and Velocity if Less than 3 Inertial Sensors Pass the Comparison Test of Process 2. If less than 3 of the inertial sensors pass the comparison tests of process 2, then position is computed using the logic of process 3.1 and velocity is computed using the logic of process 3.2.

3.1 Compution of Position Using One Inertial Sensor. When position is computed using the logic of this section, the computation is performed as outlined in the 3 steps listed below.

1. If one or two inertial sensors pass the comparison test of process 2, then one of the inertial sensors that passsed is selected to supply postion data. If none of the inertial sensors passed the comparison test of process 2, then one of the inertial sensors which is outputting valid signals (but did not pass the comparison test of process 2) will be selected to supply position data.

2. Next, a unit vehicle position vector, P, is computed using the equation below.

$$P = \begin{bmatrix} X_p \\ Y_p \\ Z_p \end{bmatrix} = \frac{\bar{R} + E_{XYZ}}{|\bar{R} + E_{XYZ}|}$$

where:

$E_{XYZ}$ is defined in process 5.

R is the unit position vector of the inertial sensor chosen for use by step 1 above (as computed by process 1).

3. Lastly, the latitude and longitude of the vehicle ($\bar{a}$ and $\bar{\Phi}$, respectively) are computed from the equations below:

$$\bar{\Phi} = A\tan(Y_p/X_p)$$

$$\bar{a} = A\tan\left[\frac{\tan[\arccos(\sqrt{1 - Z_p^2})]}{(1 - \epsilon^2)}\right]$$

where:

$\epsilon$ is the eccentricity of the earth model used by the inertial sensor.

3.2. Computation of Velocity Using One Inertial Sensor. When velocity is computed using the logic of this section, the computation shall be performed as outlined in the 3 steps listed below.

1. The inertial sensor chosen by the logic of process 3.1, step 1, shall be chosen to supply velocity data.

2. The following assignments are made.

$\bar{V}_x = V_x; \bar{V}_y = V_y; \bar{V}_z = V_z.$ where:

$V_x, V_y$ and $V_z$ are the X, Y, Z components of velocity for the sensor chosen in step 1 above (as computed by process 1).

3. Lastly, with the values of $\bar{V}_x, \bar{V}_y,$ and $\bar{V}_z$ computed in step 2 above, the equation of step 2 of process 4.2 is invoked to compute north and east components of velocity (NORTH_VEL and EAST_VEL).

4. Position/Velocity Determination When at Least 3 Inertial Sensors Pass the Comparison Test of Process 2. If at least 3 inertial sensors pass the comparison test of process 2, then position is computed by the logic of process 4.1 and velocity is computed by the logic of process 4.2.

4.1. Computing Position. In this case position is computed by following the 3 steps listed below.

1. First, an average unit inertial position vector is computed in XYZ coordinates using the unit vectors computed by the logic of process 1 for each inertial sensor which passed the comparison test of process 2.

$$\bar{R} = \frac{\Sigma R_i}{|\Sigma R_i|}$$

where:

$\bar{R}$ is the average unit inertial position vector.

$R_i$ are the inertial unit position vectors for each of the inertial sensors which passed the comparison test of process 2. The components of $R_i$ were computed by the logic of process 1.

2. Next, a unit vehicle position vector, P, shall be computed using the equation below.

$$P = \begin{bmatrix} X_p \\ Y_p \\ Z_p \end{bmatrix} = \frac{R + E_{xyz}}{|R + E_{xyz}|}$$

where:
$E_{xyz}$ is defined by process 5.
$R$ is defined in step 1 above.

3. Lastly, the vehicle latitude and longitude ($\bar{\alpha}$ and $\bar{\phi}$, respectively) are computed from the equations below:

$$\bar{\phi} = A\tan(Y_p/X_p)$$

$$\bar{\alpha} = A\tan\left[\frac{\tan[\arccos(\sqrt{1 - Z_p^2})]}{(1 - \epsilon^2)}\right]$$

where:
$\epsilon$ is the eccentricity of the earth model used by the inertial sensors.

4.2 Computing Velocity. In this case, velocity is computed by following the 2 steps below.

1. First, the an average inertial velocity vector in XYZ coordinates shall be computed from the equation below.

$$\begin{bmatrix} \bar{V}_x \\ \bar{V}_y \\ \bar{V}_z \end{bmatrix} = [1/N] \times \left( \begin{bmatrix} V_{x1} \\ V_{y1} \\ V_{z1} \end{bmatrix} + \begin{bmatrix} V_{x3} \\ V_{y3} \\ V_{z3} \end{bmatrix} + \ldots + \begin{bmatrix} V_{xN} \\ V_{yN} \\ V_{zN} \end{bmatrix} \right)$$

where:
$V_{x1}, V_{y1}, V_{z1}, V_{x3}, V_{y3} \ldots V_{xN}, V_{yN}, V_{zN}$ are the X, Y, and Z components of the inertial velocity vectors computed by process 1 for those inertial sensors which passed the comparison test of process 2.
N is the total number of inertial sensors which passed the comparison test of process 2.

2. x indicates multiplication. Lastly, the north and east components of velocity (NORTH_VEL, EAST_VEL) shall be computed from the equation below.

$$\begin{bmatrix} NORTH\_VEL \\ EAST\_VEL \end{bmatrix} =$$

$$\begin{bmatrix} -\sin(\bar{\phi}) & \cos(\bar{\phi}) & 0 \\ -\sin(\bar{\alpha})\cos(\bar{\phi}) & -\sin(\bar{\alpha})\sin(\bar{\phi}) & \cos(\bar{\alpha}) \end{bmatrix} \begin{bmatrix} \bar{V}_x \\ \bar{V}_y \\ \bar{V}_z \end{bmatrix}$$

(This equation resolves the average inertial velocity vector in XYZ coordinates (computed in step 1), into north and east components which are referenced to the vehicle position computed in process 4.1 or process 3.1, whichever applies)
where:
$\bar{\phi}$ and $\bar{\alpha}$ are computed as defined in process 3.1, step 3 or process 4.1, step 3, whichever is applicable.

5. Determination of the Bias Vector, $E_{xyz}$. When a current estimate of latitude/longitude bias in inertial position (LATBIAS, LONBIAS) exists, the bias vector $E_{xyz}$ is computed using the equation below.

$$E_{xyz} = \begin{bmatrix} E_x \\ E_y \\ E_z \end{bmatrix} =$$

$$\begin{bmatrix} -\cos(\theta)\sin(\phi) & -\sin(\theta)\cos(\phi) \\ \cos(\theta)\cos(\phi) & -\sin(\theta)\sin(\phi) \\ 0 & \cos(\theta) \end{bmatrix} \begin{bmatrix} LONBIAS \\ LATBIAS \end{bmatrix}$$

where:
LONBIAS and LATBIAS are the latitude and longitude inertial position biases (in terms of an angular difference between a vehicle position estimate and the mean inertial position) computed in process 4.1 step 1 or the position output by the sensor chosen in step 1 of process 3.1, whichever is applicable. A vehicle positon estimate may come from a radio fix, ground fix or any other means.
$\theta = A\tan[(1-\epsilon^2)\tan(\alpha)]$
$\alpha$ = inertial latitude at the time of LATBIAS/LONBIAS determination.
$\phi$ = inertial longitude at the time of LATBIAS/LONBIAS determination.
$\epsilon$ is the eccentricity of the earth model used by the inertial sensors.

In summary, the method described hereto has the following features:

(A) All inertial sensor data is resolved into a common coordinate system as is an estimate of inertial position bias. Reasonableness testing and averaging is done in the common coordinate system and the results are converted back into latitude, longitude and north and east components of velocity.

(B) Averaging and reasonableness tests are performed at all latitudes.

(C) The inertial position bias is stored as an error vector in a cartesian coordinate system.

Thus, this inertial sensor usage and data averaging method provides a common coordinate system, free of discontinuities, in which position and velocity data from all inertial sensors aboard the vehicle are resolved into. In the common coordinate system, the data output by each inertial sensor is compared to data output by the other inertial sensors. If three or more inertial sensors compare within a tolerance then data from all inertial sensor units comparing within the tolerance and a bias estimate are combined to obtain a better estimate of vehicle position and velocity than would be attained using any single inertial sensor.

The advantages of the described method are indicated hereafter:

A. This inertial sensor usage and data averaging method provides for the transformation of inertial position data, velocity data, and an estimate of inertial position bias into a common coordinate system which is free of the discontinuities present with a latitude/longitude coordinate system. Using this common coordinate system, an estimate of inertial sensor accuracy and the averaging of inertial sensor data can be accomplished. After performing the accuracy and averaging computations, the resulting position and velocity data is transformed back into a geodetic latitude/longitude system for use and display by the user.

B. A common coordinate system which is free of discontinuities allows for an accurate comparison of position and velocity data from each sensor and also allows for accurate averaging of positions and velocities and an accurate measure of a previously computed inertial position bias is maintained.

While the invention has been described in its preferred embodiment, it is to be understood that the words which have been used are words of description rather than limitation and that changes may be made within the purview of the appended claims without departing from the true scope and spirit of the invention in its broader aspects.

The embodiments of an invention in which an exclusive property or right is claimed are defined as follows:

1. A multiple sensor method of computing position and velocity from data from 3 or more sensor units comprising the steps of:
 resolving the data from each sensor unit into a common coordinate system for obtaining a unit position vector and a horizontal velocity vector for each of the sensor units;
 comparing in a comparison test each unit position vector with a corresponding unit position vector of a selective prior reading thereof for each of the sensor units;
 comparing in the comparison test each velocity vector with a corresponding velocity vector of a selective prior reading for each of the sensor units;
 determining by using a selective comparison process which sensor units pass the comparison tests of the comparisons of each of the sensor units and which sensor unit is closest to passing if not passing; and
 computing position and velocity using a first selective computing process if less than three sensor units pass their comparison tests and using data from one sensor unit either passing its comparison tests or being closest to passing if not passing, or computing position and velocity using a second selective computing process and using data from all sensor units which pass their comparison tests.

2. The method of claim 1, including:
 storing an inertial position bias as an error vector in said common coordinate system.

3. The method of claim 1, including:
 transforming the unit position vector and the horizontal velocity vector as computed to a geodetic latitude/longitude system for use by a user.

4. The method of claim 2, including:
 transforming the unit position vector and the horizontal velocity vector as computed to a geodetic latitude/longitude system for use by a user.

5. A multiple sensor method of computing position and velocity from data from a first sensor unit and a second sensor unit and a third sensor unit, comprising the steps of:
 resolving the data from the first sensor unit and the data from the second sensor unit and the data from the third sensor unit into a common XYZ coordinate system for obtaining a unit position vector and a horizontal velocity vector for each of the three sensor units;
 comparing in a comparison test each unit position vector with a corresponding unit position vector of a selective prior reading thereof for each of the three sensor units;
 comparing in the comparison test each velocity vector with a corresponding velocity vector of a selective prior reading for each of the three sensor units;
 determining by using a selective comparison process which sensor units pass the comparison tests of the comparisons of each of the three sensor units and which sensor unit is closest to passing if not passing;
 computing position and velocity using a first selective computing process if all three sensor units do not pass their comparison tests and using data from one sensor unit either passing its comparison tests or being closest to passing if not passing, or computing position and velocity using a second selective computing process and using data from all three sensor units if all three sensor units pass their comparison tests;
 storing an inertial position bias as an error vector in the XYZ coordinate system; and
 transforming the unit position vector and the horizontal velocity vector as computed to a geodetic latitude/longitude system for use by a user.

6. A multiple sensor system comprising:
 three or more inertial sensor units;
 each said sensor unit having a multi-line output terminal;
 a computer having N (N being the number of sensor units) multi-line input terminals with a multi-line connector connecting to each sensor output terminal, said computer having a multi-line output terminal;
 said computer having means receiving navigation data from each of said sensor units and resolving said data into a common coordinate system for obtaining a unit position vector and a horizontal velocity vector for each of said sensor units;
 means for comparing each unit position vector and velocity vector with a corresponding unit position vector and velocity vector, respectively, of a selective prior reading for each of said sensor units;
 means responsive to said comparing means for determining which sensor units pass comparison tests of the data comparisons of each of said sensor units; and
 means for computing position and velocity (1) using a first selective computing process if less than three sensor units pass their comparison tests whereby data from a sensor unit providing the best data is utilized or (2) using a second selective computing process whereby data from all sensor units passing their comparison tests are utilized.

7. The system of claim 6, including:
 means for storing an inertial position bias as an error vector in said common coordinate system.

8. The system of claim 7, including:
 means for transforming the unit position vector and horizontal velocity vector as computed to a geodetic latitude/longitude system for use by a user.

9. The system of claim 6, including:
 means for transforming the unit position vector and horizontal velocity vector as computed to a geodetic latitude/longitude system for use by a user.

10. A multiple sensor system comprising:
 a first sensor unit having three gyroscopes and three accelerometers;
 a second sensor unit having three gyroscopes and three accelerometers;
 a third sensor unit having three gyroscopes and three accelerometers;
 said first and second and third sensor units having respectively a first multi-line output terminal and a second multi-line output terminal and a third multi-line output terminal;

a computer having a first multi-line input terminal with a first multi-line connector connecting to the first sensor output terminal and having a second multi-line input terminal with a second multi-line connector connecting to the second sensor output terminal and having a third multi-line input terminal with a third multi-line connector connecting to the third sensor output terminal, said computer having a multi-line output terminal;

said computer having means receiving navigation data from each of said sensor units and resolving said data into a common coordinate system for obtaining a unit position vector and a horizontal velocity vector for each of said sensor units;

means for comparing each unit position vector and velocity vector with a corresponding unit position vector and velocity vector, respectively, of a selective prior reading for each of said sensor units;

means responsive to said comparing means for determining which sensor units pass comparison tests of the data comparisons of each of said sensor units;

means for computing position and velocity (1) using a first selective computing process if less than three sensor units pass their comparison tests whereby data from a sensor unit providing the best data is utilized or (2) using a second selective computing process whereby data from all sensor units passing their comparison tests are utilized;

means for storing an inertial position bias as an error vector in said common coordinate system; and means for transforming the unit position vector and horizontal velocity vector as computed to a geodetic latitude/longitude system for use by a user.

* * * * *